(12) United States Patent
Clark et al.

(10) Patent No.: US 10,148,662 B1
(45) Date of Patent: Dec. 4, 2018

(54) DE-DUPLICATION OF ACCESS CONTROL LISTS

(71) Applicant: EMC IP Holding Company LLC, Hopkinton, MA (US)

(72) Inventors: Morgan A Clark, South Plainfield, NJ (US); William C Davenport, Burlington, NJ (US); Michael D Schouten, Lake Katrine, NY (US); Qi Mao, Shanghai (CN); Yingchao Zhou, Beijing (CN); Yunfei Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 516 days.

(21) Appl. No.: 14/602,251

(22) Filed: Jan. 21, 2015

(51) Int. Cl.
| | | |
|---|---|---|
| G06F 17/30 | (2006.01) | |
| G06F 11/00 | (2006.01) | |
| H04L 29/06 | (2006.01) | |
| G06F 11/14 | (2006.01) | |

(52) U.S. Cl.
CPC ........ *H04L 63/101* (2013.01); *G06F 11/1451* (2013.01); *G06F 11/1453* (2013.01); *G06F 11/1464* (2013.01); *G06F 17/3012* (2013.01); *G06F 17/3033* (2013.01); *G06F 17/30073* (2013.01); *G06F 17/30097* (2013.01); *G06F 17/30109* (2013.01); *G06F 17/30342* (2013.01)

(58) Field of Classification Search
CPC ......... G06F 17/30159; G06F 17/30073; G06F 17/30342; G06F 17/30516; G06F 17/30097; G06F 17/3033; G06F 17/30109; G06F 17/3012; G06F 17/3007; G06F 11/1464; G06F 11/1451; G06F 11/1435; G06F 11/1453; G06F 2221/2141; G06F 21/6209; G06F 12/0864; H04L 63/101
See application file for complete search history.

(56) References Cited

U.S. PATENT DOCUMENTS

| | | | | |
|---|---|---|---|---|
| 5,333,317 A | * | 7/1994 | Dann | ................ G06F 17/30988 |
| 5,701,458 A | * | 12/1997 | Bsaibes | ............... G06F 21/6218 |
| 5,825,877 A | * | 10/1998 | Dan | ........................ G06F 21/54 |
| | | | | 705/54 |
| 6,064,656 A | * | 5/2000 | Angal | ................. G06F 21/6218 |
| | | | | 370/254 |
| 6,182,142 B1 | * | 1/2001 | Win | ...................... G06F 21/604 |
| | | | | 709/219 |
| 6,480,851 B1 | * | 11/2002 | Terek | ................ G06F 17/30067 |
| | | | | 707/812 |

(Continued)

*Primary Examiner* — Srirama Channavajjala
(74) *Attorney, Agent, or Firm* — BainwoodHuang (57) ABSTRACT

Described are methods, systems, and apparatus, including computer program products for de-duplicating access control lists (ACLs). A first ACL associated with a first computer file is received. A first checksum based at least in part on the first ACL is calculated. One or more directory entries based on the first checksum are retrieved from a de-duplication directory, wherein each directory entry of the one or more directory entries comprises a reference to an ACL and a name comprising the first checksum. A directory entry of the one or more directory entries is identified that references a second ACL that specifies the same permissions as the first ACL. A reference to the second ACL of the directory entry is added to the first computer file.

16 Claims, 9 Drawing Sheets

(56) References Cited

U.S. PATENT DOCUMENTS

| | | | |
|---|---|---|---|
| 7,185,192 B1* | 2/2007 | Kahn | G06F 21/6218 707/999.003 |
| 7,613,701 B2 | 11/2009 | Zhao et al. | |
| 8,050,251 B2* | 11/2011 | Ongole | H04L 12/4641 370/351 |
| 8,315,985 B1 | 11/2012 | Ohr et al. | |
| 8,352,540 B2 | 1/2013 | Anglin et al. | |
| 8,528,085 B1 | 9/2013 | Juels | |
| 8,782,086 B2* | 7/2014 | Resch | G06F 11/1004 707/783 |
| 8,788,815 B1* | 7/2014 | Garcia | H04L 63/0869 713/165 |
| 9,141,633 B1 | 9/2015 | Li et al. | |
| 2003/0115205 A1* | 6/2003 | French | G06F 21/41 |
| 2004/0030702 A1* | 2/2004 | Houston | G06F 17/30943 |
| 2004/0044707 A1* | 3/2004 | Richard | G06F 11/1461 |
| 2006/0156018 A1* | 7/2006 | Lauer | G06F 21/6218 713/182 |
| 2006/0193467 A1* | 8/2006 | Levin | G06F 21/6218 379/413.04 |
| 2007/0038687 A1* | 2/2007 | Carroll | G06F 17/3002 |
| 2008/0043273 A1* | 2/2008 | Simske | H04N 1/00002 358/1.14 |
| 2008/0133619 A1* | 6/2008 | Nichols | G06F 11/1451 |
| 2010/0036820 A1* | 2/2010 | Stergiou | H04L 45/00 711/206 |
| 2010/0332454 A1* | 12/2010 | Prahlad | G06F 17/30082 707/654 |
| 2012/0151169 A1* | 6/2012 | Mori | G06F 3/061 711/166 |
| 2013/0246470 A1* | 9/2013 | Price | G06F 21/6218 707/783 |
| 2014/0201135 A1* | 7/2014 | Smid | G06F 17/30575 707/610 |

* cited by examiner

DE-DUPLICATION OF ACCESS CONTROL LISTS

FIELD OF THE TECHNOLOGY

The present technology relates generally to de-duplicating access control lists and, more specifically, to de-duplicating access control lists using directory functionality.

BACKGROUND

Computer file systems and/or file system protocols often use access control lists to specify the users, groups of users, etc. that can access a file or other object stored in the file system. Access control lists can specify the types of access and/or types of operations users can perform on a file or other object. In some instances, these types of access and/or operations can be referred to as permissions. For example, an access control list for a file can specify that a first user can read the file; a second user can read the file and modify the file; and a third user can read the file, modify the file, and execute the file. Many file systems allow permissions to be set individually for each file in the file system. In some implementations of file systems, an access control list is accordingly created for each file in the file system. This can lead to storing multiple access control lists that contain the same permissions. As the number of the files in an operating system and the number of users of that file system grow, the access control lists can occupy valuable storage space.

SUMMARY OF THE TECHNOLOGY

Accordingly, there is a need to efficiently store access control lists. The technology described herein includes methods and systems for de-duplicating access control lists by providing mechanisms to efficiently locate duplicate access control lists while preserving system resources, so that a single instance of each unique access control list can be stored.

In one aspect, there is a storage system-implemented method for de-duplicating access control lists. The method includes receiving, by the storage system, a first access control list (ACL) associated with a first computer file. The method includes calculating, by the storage system, a first checksum based at least in part on the first ACL. The method includes retrieving, by the storage system, from a de-duplication directory, one or more directory entries based on the first checksum, wherein each directory entry of the one or more directory entries comprises a reference to an ACL and a name comprising the first checksum. The method includes identifying, by the storage system, a directory entry of the one or more directory entries that references a second ACL that specifies the same permissions as the first ACL. The method includes adding, by the storage system, to the first computer file, a reference to the second ACL of the directory entry.

In some embodiments, the method includes incrementing, by the storage system, a reference count associated with the second ACL. In some embodiments, the method includes storing, by the storage system, the first computer file. In some embodiments, the second ACL is retrieved from an ACL database stored on the storage system. In some embodiments, the one or more directory entries comprises a first directory entry having a first name comprising the checksum, and a second directory entry having a second name comprising the checksum with duplicate indicia appended.

In another aspect, there is a storage system. The storage system includes a storage processor providing a file system, the system processor configured to: receive a first access control list (ACL) associated with a first computer file; calculate a first checksum based at least in part on the first ACL; retrieve, from a de-duplication directory, one or more directory entries based on the first checksum, wherein each directory entry of the one or more directory entries comprises a reference to an ACL and a name comprising the first checksum; identify a directory entry of the one or more director entries that references a second ACL that specifies the same permissions as the first ACL; and add to the first computer file a reference to the second ACL of the directory entry.

In some embodiments, the storage processor is further configured to increment a reference count associated with the second ACL. In some embodiments, the storage processor is further configured to store the first computer file. In some embodiments, the second ACL is retrieved from an ACL database stored on the storage system. In some embodiments, the one or more directory entries comprises a first directory entry having a first name comprising the checksum, and a second directory entry having a second name comprising the checksum with duplicate indicia appended.

In another aspect, there is a storage-system implemented method for reducing duplication of access control lists. The method includes receiving, by the storage system, a first access control list (ACL) associated with a first computer file. The method includes calculating, by the storage system, a first checksum based at least in part on the first ACL. The method includes retrieving, by the storage system, from a de-duplication directory, one or more directory entries based on the first checksum, wherein each directory entry of the one or more directory entries comprises a reference to an ACL and a name comprising the first checksum. The method includes determining, by the storage system, that each directory entry of the one or more directory entries do not reference an ACL matching the first ACL. The method includes storing, by the storage system, to the de-duplication directory, a first directory entry comprising a reference to the first ACL and a name comprising the first checksum. The method includes storing, by the storage system, the first ACL.

In some embodiments, the method includes storing, by the storage system, the first computer file. In some embodiments, the first ACL is stored in an ACL database stored on the storage system. In some embodiments, the one or more directory entries comprises a second directory entry having a second name comprising the checksum, and a third directory entry having a third name comprising the checksum with first duplicate indicia appended. In some embodiments, the name of the first directory entry comprises the first checksum with second duplicate indicia appended.

In another aspect, there is a storage system. The storage system includes a storage system processor providing a file system, the storage processor configured to: receive a first access control list (ACL) associated with a first computer file; calculate a first checksum based at least in part on the first ACL; retrieve from a de-duplication directory, one or more directory entries based on the first checksum, wherein each directory entry of the one or more directory entries comprises a reference to an ACL and a name comprising the first checksum; determine that each directory entry of the one or more directory entries do not reference an ACL matching the first ACL; store to the de-duplication directory, a first directory entry comprising a reference to the first ACL and a name comprising the first checksum; and store the first ACL.

In some embodiments, the storage processor is further configured to store the first computer file. In some embodiments, the first ACL is stored in an ACL database stored on the storage system. In some embodiments, the one or more directory entries comprises a second directory entry having a second name comprising the checksum, and a third directory entry having a third name comprising the checksum with first duplicate indicia appended. In some embodiments, the name of the first directory entry comprises the first checksum with second duplicate indicia appended.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The technology described herein can provide efficient mechanisms for de-duplicating access control lists (ACLs) while preserving system resources, such as memory. In some embodiments, the technology can be implemented by a storage system providing a file system with user permissions for each file. The storage system can maintain a de-duplication database containing an entry for each unique ACL in the file system. When a new ACL associated with a file is received, the storage system can search the de-duplication database to determine if an ACL already stored on the storage system specifies the same permissions as the new ACL. If so, the found ACL can be used instead of storing the new ACL.

The technology can include implementing the deduplication database as a directory stored on disk. The directory can contain a directory entry for each unique ACL in the file system, where the directory entry's name is a checksum calculated based on the ACL along with information to distinguish between ACLs having the same checksum. The directory entry can also contain a reference to the ACL and/or an identification its associated ACL. When the storage system receives a new ACL associated with a file (e.g., a new file or a file with permissions that have been changed), the storage system can use the de-duplication directory to determine if the new ACL is the same as an ACL already stored on the storage system. The storage system can calculate a first checksum based on the new ACL. The storage system can perform a lookup in the de-duplication directory for directory entries with a name matching the new checksum. Beneficially, this lookup can leverage the existing directory functionality. If a directory entry with a matching name is found, the storage system can compare the new ACL with the ACL referenced by the found directory entry. If the new ACL matches the ACL referenced by the found directory entry, the file can be associated with the existing ACL without storing an additional copy on the storage system.

EXEMPLARY STORAGE SYSTEM ENVIRONMENTS

Figure 1:
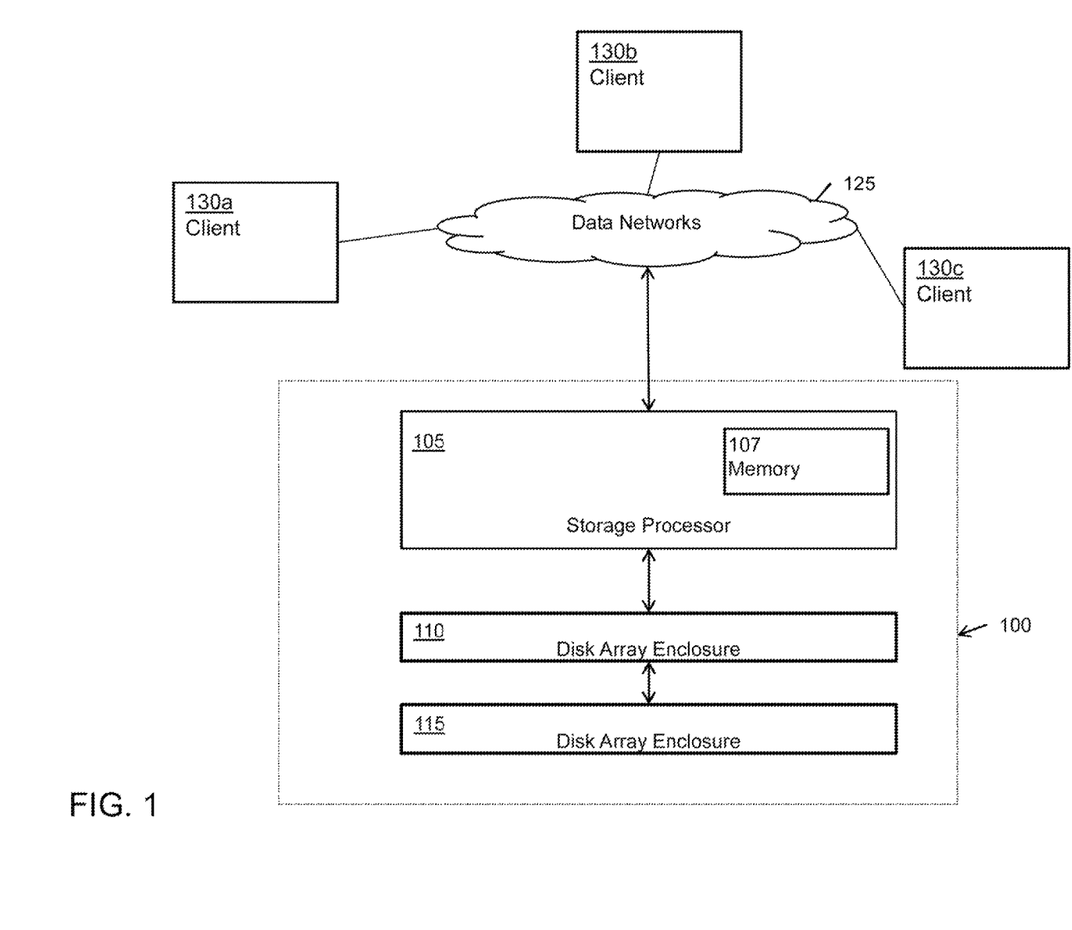
FIG. 1 depicts a storage system, in accordance with the technology.

FIG. 1 depicts storage system 100, in accordance with the technology. Storage system 100 includes storage processor 105. Storage processor 105 can include memory 107 (e.g., ram). Storage processor 105 can be any computing devices, such as servers, blade servers, etc. Storage system 100 includes disk array enclosure 110 and disk array enclosure 115. Disk array enclosures 110 and 115 can include any form of storage devices, such as magnetic disk drives, flash memory drives, solid state drives, etc. As shown, storage processor 105 is connected to disk array enclosure 110, and disk array enclosure 110 is connected to disk array enclosure 115. In illustrated storage system 100, storage processor 105 can read data from and write data to the storage devices in disk array enclosure 110 and disk array enclosure 115. Storage system 100 can be connected to clients 130 via data network 125. The illustrated connections can each be any type of connection for communicating data. In general, storage system 100 can provide one or more file systems for use by clients 130. File systems can be stored on storage devices in disk array enclosure 110 and disk array enclosure 115. Storage processor 105 can service IO requests (e.g., commands to read data from or write data to storage system 100) received from clients 130 via data networks 125. For example, clients 130 can read files from and/or save files to storage system 100.

It should be appreciated that storage system 100 in FIG. 1 is an exemplary storage system in accordance with the technology. Other configurations are contemplated. In some embodiments, the storage system can include more than one storage processor. In some embodiments, the storage processors and disk enclosures can be in the same enclosure.

Acl De-Duplication

Figure 2:
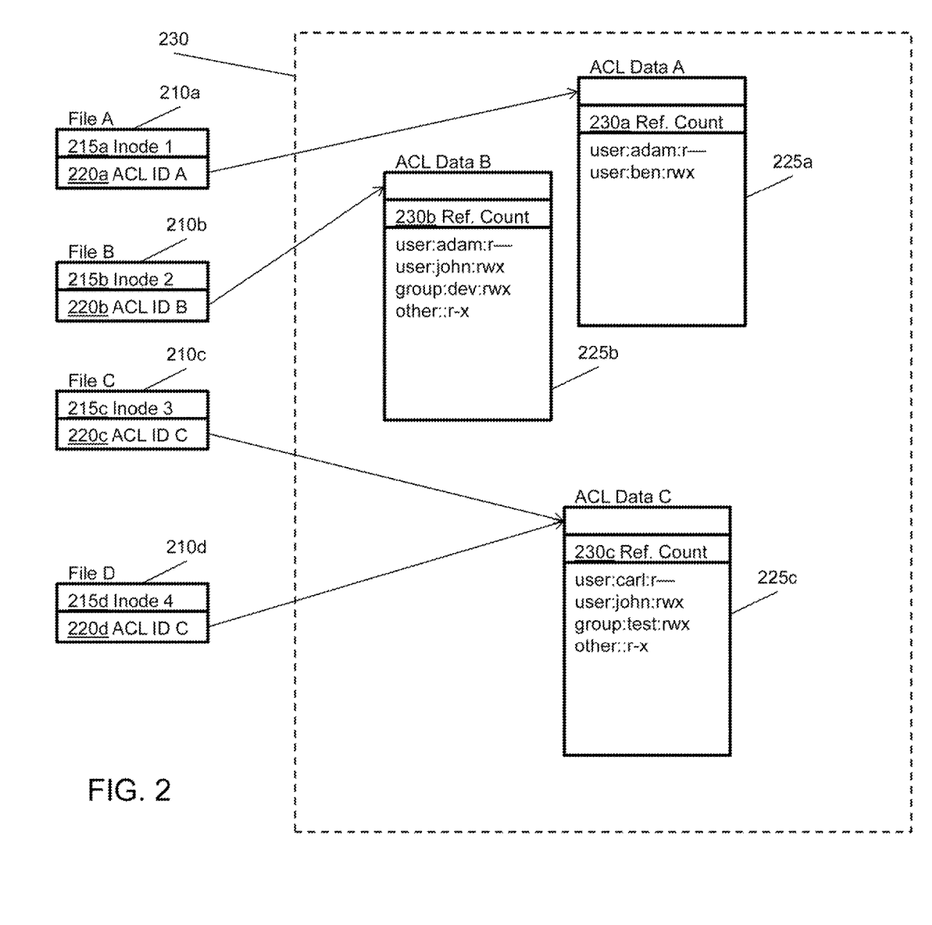
FIG. 2 illustrates the storage of ACL data in accordance with embodiments of the technology.

FIG. 2 illustrates the storage of ACL data in accordance with embodiments of the technology. Files in a file system can be represented by index nodes (inodes), as is understood by those of skill in the art. For example, inode 210a can represent a file A, inode 210b can represent a file B, inode 210c can represent a file C, and inode 210d can represent a file D. Modes 210 can be stored as a part of a file system (e.g., a file system stored on storage system 100 of FIG. 1). As illustrated, inodes 210 can store inode IDs 215 for identification. Inodes 210 can store ACL IDs 220 to indicate which ACL applies to the files represented by inodes 210. For example, inode 210a represents a file A. Inode 210a contains ACL ID 220a that indicates ACL Data 225a provides the permissions for file A. Similarly, inode 210b represents a file B. Inode 210b contains ACL ID 220b that indicates ACL Data 225b provides the permissions for file B. Inode 210c contains ACL ID 220c that indicates ACL Data 225c provides the permissions for file C. Inode 210d contains ACL ID 220d that indicates ACL Data 225c provides the permissions for file D. Both ACL ID 220c of inode 210c and ACL ID 220*d* of inode 210*d* refer to ACL Data 225*c* indicating File C and File D have the same permissions. Beneficially, the system can store a single instance of ACL Data 225*c*, rather than storing a copy for each of inode 210*c* and inode 210*d*. ACL data 225 can include reference counts 230 to track the number of files for which it provides permissions. In some embodiments, ACL data 225 can be stored in ACL database 230 (e.g., stored in a database on storage system 100 of FIG. 1).

Figure 3:
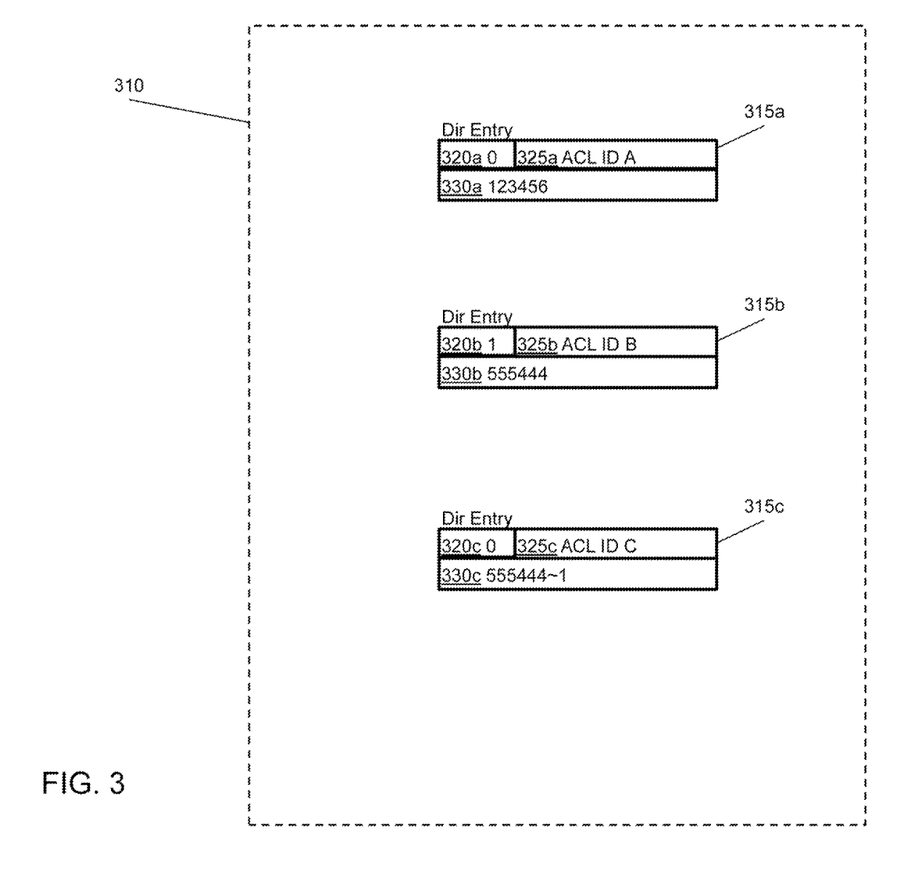
FIG. 3 illustrates the contents of a de-duplication directory in accordance with embodiments of the technology.

FIG. 3 illustrates the contents of de-duplication directory 310 in accordance with embodiments of the technology. De-duplication directory 310 can be stored on disk (e.g., stored on one or more disks in disk array enclosure 110 and/or disk array enclosure 115 of storage system 100 of FIG. 1). In some embodiments, only portions of de-duplication directory 310 are read into memory (e.g., memory 107 of system 100). Beneficially, this can prevent ACL de-duplication data from inefficiently occupying a large amount of memory. In some embodiments, de-duplication directory 310 is implemented using a hashed directory structure (e.g., utilizing extendable hashing) to facilitate efficient lookup. As illustrated, de-duplication directory 310 contains directory entries 315. In accordance with the technology, each of directory entries 315 is associated with one of ACL data 225. Directory entry 315*a* is associated with ACL Data 225*a*. Directory entry 315*a* contains nDups 320*a*, ACL ID 325*a*, and name 330*a*. ACL ID 325*a* refers to ACL Data 225*a* to indicate directory entry 315*a* is associated with ACL Data 225*a*. Name 330*a* is a checksum calculated based on ACL Data 225*a*. As illustrated, name 330*a* has the value "123456." nDups 320*a* provides the number of other directory entries whose names include the same hash value (zero in the case of Directory entry 315*a*).

Directory entry 315*b* is associated with ACL Data 225*b*. Directory entry 315*b* contains nDups 320*b*, ACL ID 325*b*, and name 330*b*. ACL ID 325*b* refers to ACL Data 225*b* to indicate directory entry 315*b* is associated with ACL Data 225*b*. Name 330*b* is a checksum calculated based on ACL Data 225*b*. As illustrated, name 330*b* has the value "555444." nDups 320*b* provides the number of other directory entries whose names include the same hash value (one in the case of Directory entry 315*b*).

Directory entry 315*c* is associated with ACL Data 225*c*. Directory entry 315*c* contains nDups 320*c*, ACL ID 325*c*, and name 330*c*. ACL ID 325*c* refers to ACL Data 225*c* to indicate directory entry 315*c* is associated with ACL Data 225*c*. Name 330*c* is a checksum calculated based on ACL Data 225*c* with "~1" appended to the end to indicate that directory entry 315*c* is the first directory entry containing a duplicate checksum as directory entry 320*b*. As illustrated, name 330*c* has the value "555444~1." nDups 320*c* is not used since Directory entry 315*c* is a first duplicate. In some embodiments, appending to the checksum "~" followed by a number to form the directory entry name can permit distinguishing between directory entries associated with distinct ACLs that have the same checksum value. In some embodiments, other indicia of checksum duplication can be used.

Figure 4:
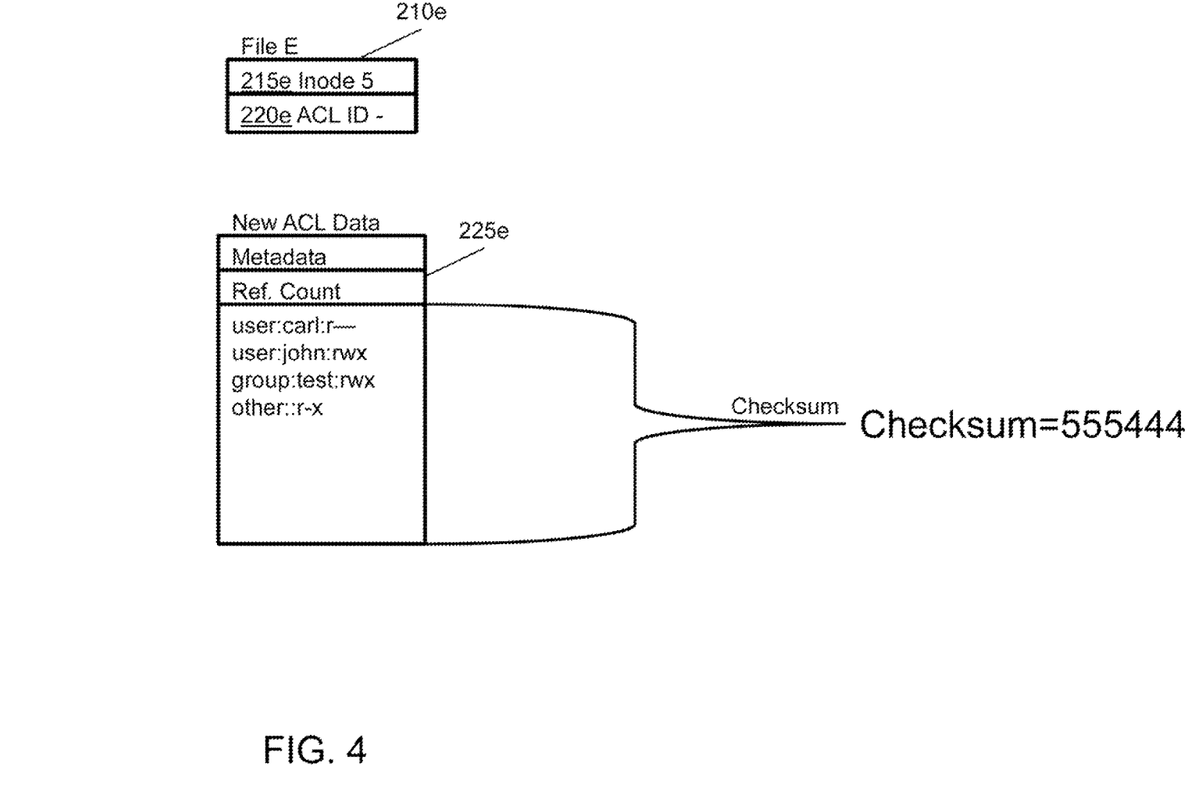
FIGS. 4 and 5 illustrate de-duplicating ACLs in accordance with embodiment of the technology.
Figure 5:
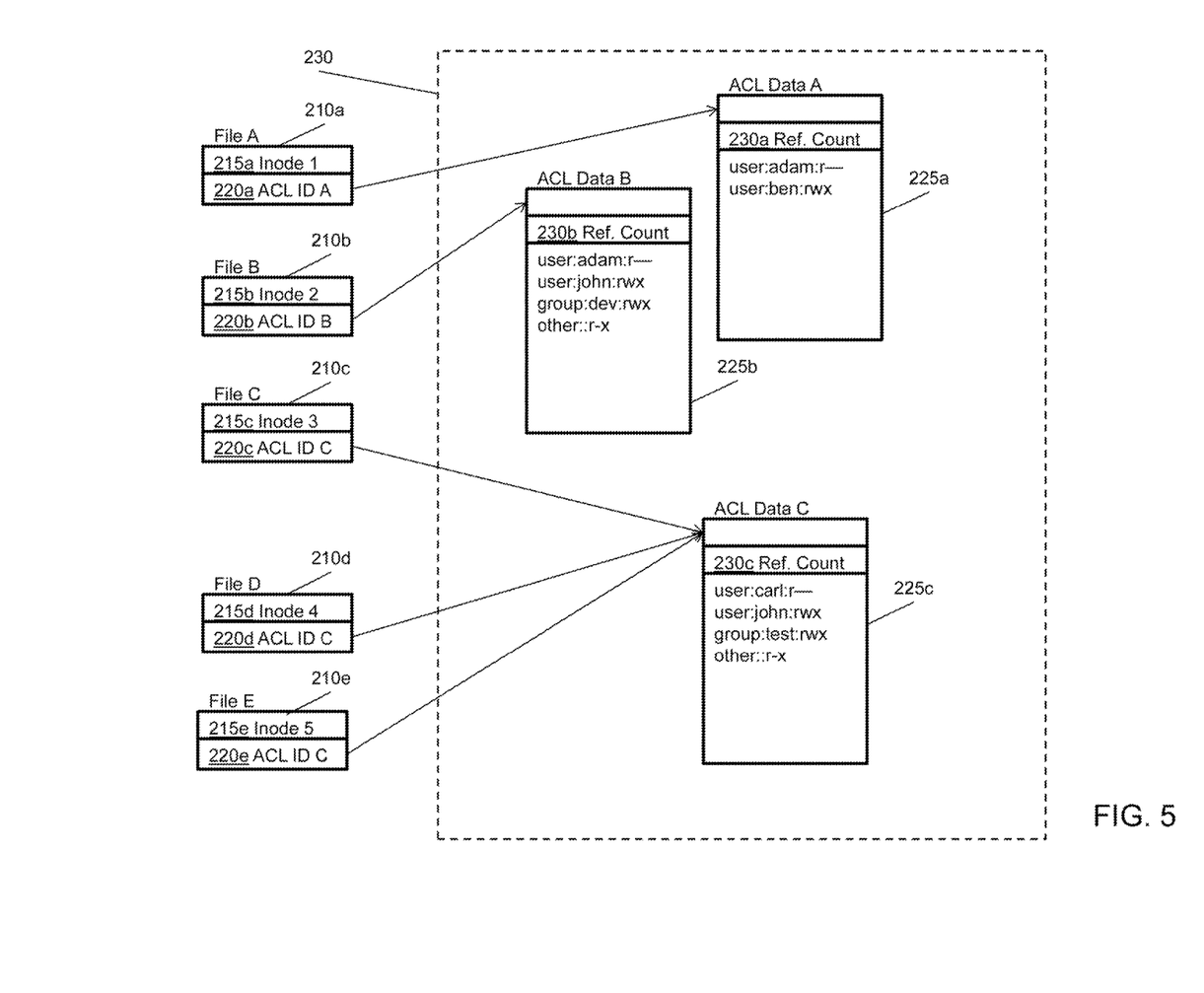

FIGS. 4 and 5 illustrate de-duplicating ACLs in accordance with the technology. In the illustrated embodiment, FIGS. 2 and 3 illustrate the initial state of the stored access control data in ACL database 230 (e.g., ACL data 225) and de-duplication directory 310. Referring to FIG. 4, inode 210*e* can represent new file, file E. For example, file E can be received by a storage system for storage in a file system. Inode 210*e* is associated with ACL data 225*e*. In accordance with the technology, a checksum can be calculated based on ACL data 225*e*. As illustrated, the checksum is "555444." The technology can then search de-duplication directory 310 for directory entry with the name "555444." In the illustrated embodiment, directory entry 315*b*, with matching name 330*b* of "555444," can be located using the directory structure of de-duplication directory 310. The technology can retrieve ACL Data 225*b* based on directory entry 315*b* (e.g., by using ACL ID 325*b* contained in directory entry 315*b*). The technology can compare ACL data 225*b* to ACL data 225*e* to determine if they both contain the same permissions. As illustrated, ACL data 225*b* and ACL data 225*e* do not contain the same permissions.

In accordance with the technology, the storage system can then determine if there are other directory entries in de-duplication directory 310 with a name matching "555444." The storage system can read the value of nDups 320*b* to determine the number of directory entries with a name matching "555444" with additional data appended. As illustrated, nDups 320*b* is 1, indicating that there is one other directory entry with a name matching "555444." The technology can then search de-duplication directory 310 for directory entry with a name matching "555444~1" (e.g., "~1" indicating the first duplicate). In the illustrated embodiment, directory entry 315*c*, with matching name 330*b* of "555444~1," can be located using the directory structure of de-duplication directory 310. The technology can retrieve ACL Data 225*c* based on directory entry 315*c* (e.g., by using ACL ID 325*c* contained in directory entry 315*c*). The technology can compare ACL data 225*c* to ACL data 225*e* to determine if they both contain the same permissions. As illustrated, ACL data 225*c* and ACL data 225*e* contain the same permissions. In accordance with the technology, the storage system can update ACL ID 220*e* in inode 210*e* to reference ACL data 225*c*. Beneficially, new ACL data 225*e* does not need to be stored to the storage system for inode 210*e*.

FIG. 5 illustrates the file system after inode 210*e* has been associated with ACL data 225*c*. In some embodiments, reference count 230*c* can be incremented to indicate ACL data 225*c* provides permission for an additional file. Beneficially, no changes have been made to de-duplication directory 310.

Figure 6:
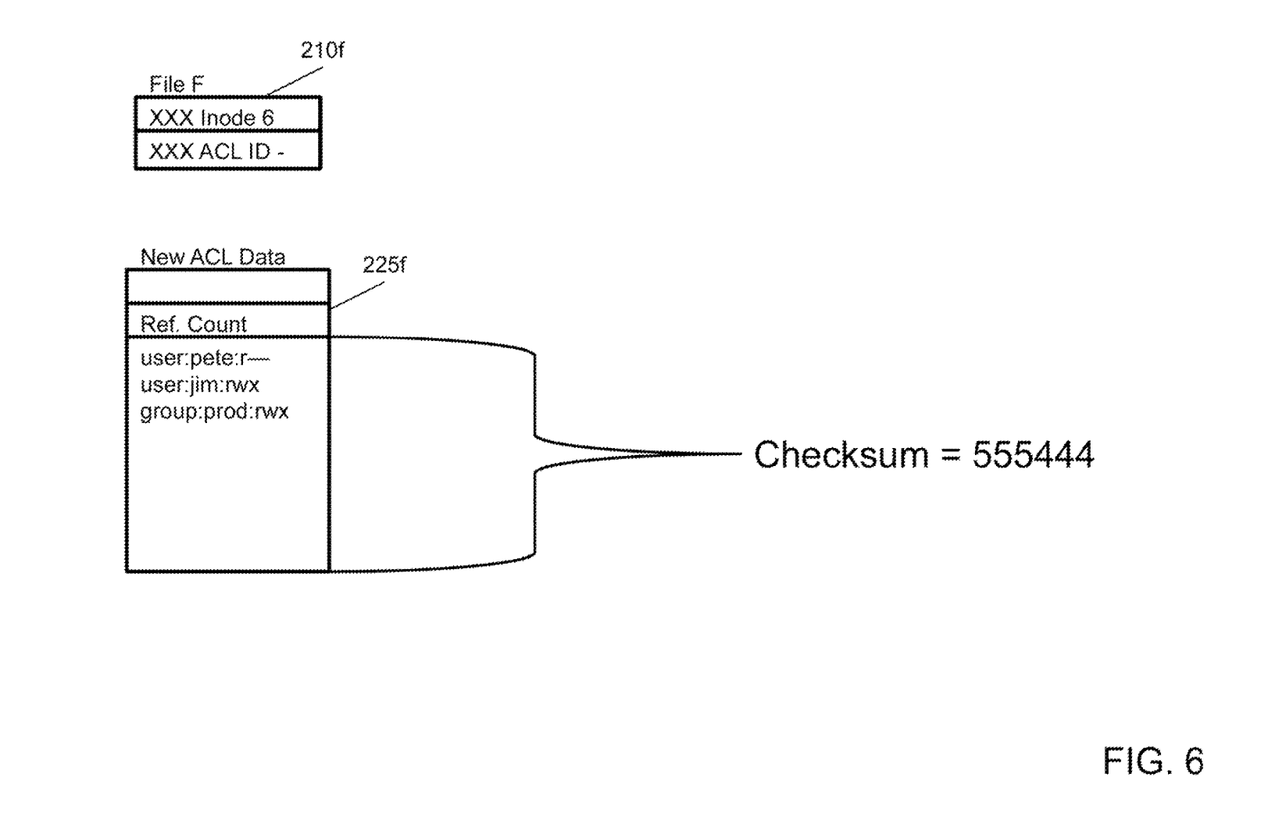
FIGS. 6-8 illustrate adding a new directory entry to the de-duplication directory when matching ACL data is not already stored in the ACL database.
Figure 7:
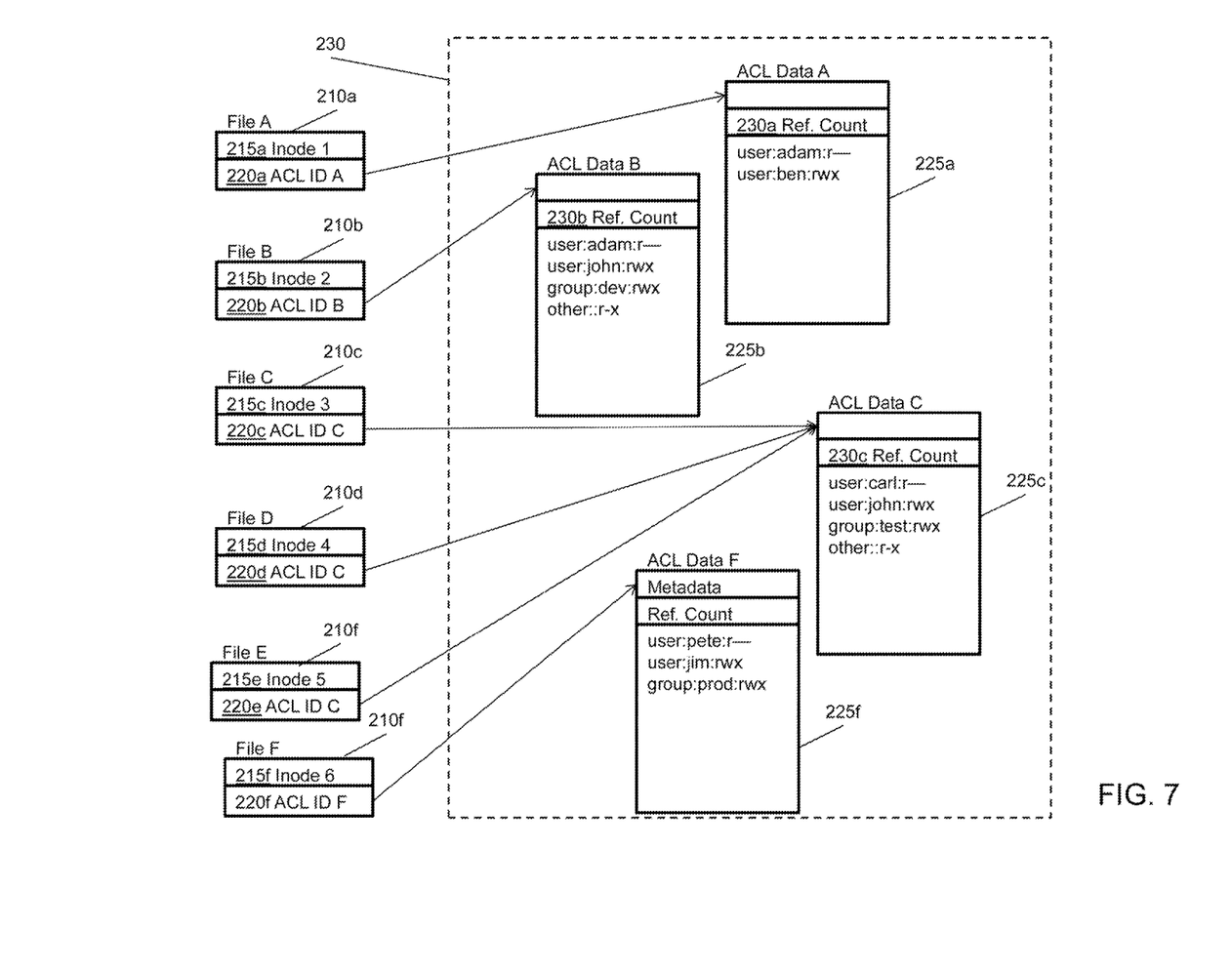
Figure 8:
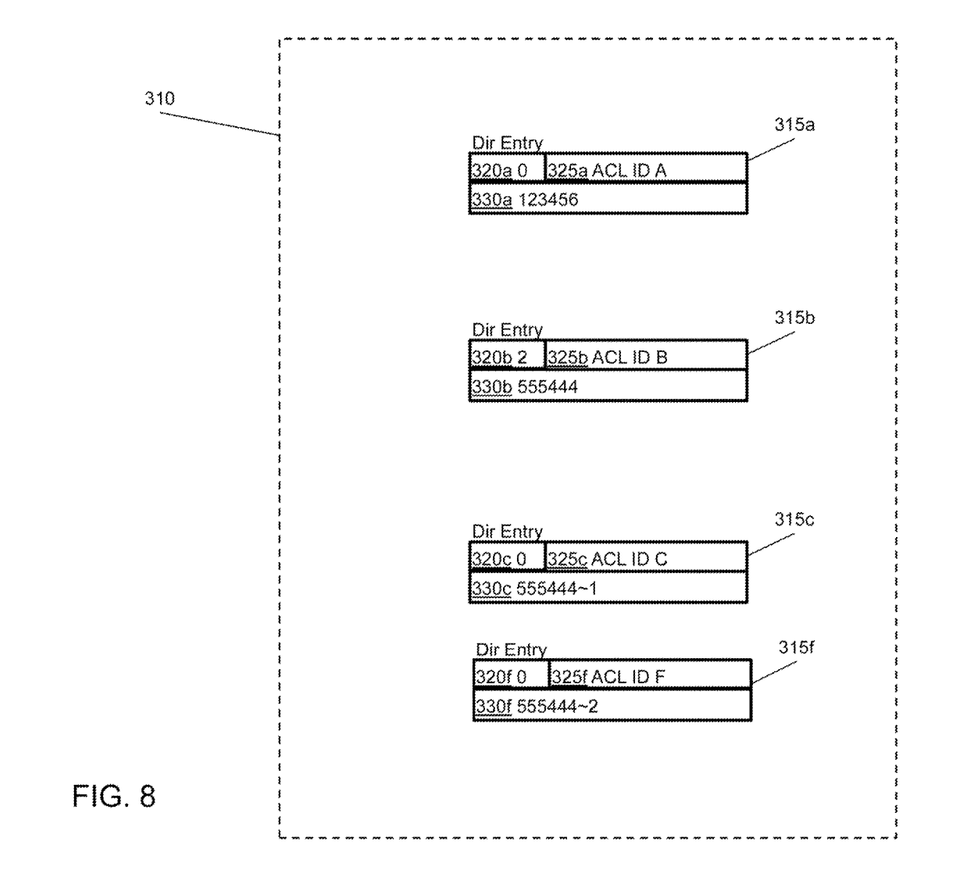

FIGS. 6-8 illustrate adding a new directory entry to de-duplication directory 310 when matching ACL data is not already stored in ACL database 230. In the illustrated embodiment, FIGS. 5 and 3 illustrate the initial state of the stored access control data in ACL database 230 (e.g., ACL data 225) and de-duplication directory 310. Referring to FIG. 6, inode 210*f* can represent a new file, file F. For example, file F can be received by a storage system for storage in a file system. Inode 210*f* is associated with ACL data 225*f*. In accordance with the technology, a checksum can be calculated based on ACL data 225*f*. As illustrated, the checksum is "555444." The technology can then search de-duplication directory 310 for directory entries with the "555444." In the illustrated embodiment, directory entry 315*b*, with matching name 330*b* of "555444," can be located using the directory structure of de-duplication directory 310. The technology can retrieve ACL Data 225*b* based on directory entry 315*b* (e.g., by using ACL ID 325*b* contained in directory entry 315*b*). The technology can compare ACL data 225*b* to ACL data 225*f* to determine if they both contain the same permissions. As illustrated, ACL data 225*b* and ACL data 225*f* do not contain the same permissions.

In accordance with the technology, the storage system can then determine if there are other directory entries in de-duplication directory 310 with a name matching "555444."

The storage system can read the value of nDups 320b to determine the number of directory entries with a name matching "555444" with additional data appended. As illustrated, nDups 320b is 1, indicating that there is one other directory entry with a name matching "555444." The technology can then search de-duplication directory 310 for directory entry with a name matching "555444~1" (e.g., "~1" indicating the first duplicate). In the illustrated embodiment, directory entry 315c, with matching name 330c of "555444~1," can be located using the directory structure of de-duplication directory 310. The technology can retrieve ACL Data 225c based on directory entry 315c (e.g., by using ACL ID 325c contained in directory entry 315c). The technology can compare ACL data 225c to ACL data 225f to determine if they both contain the same permissions. As illustrated, ACL data 225c and ACL data 225f do not contain the same permissions. This can indicate that there is no ACL data stored on the system that matches ACL data 225f.

In response to no matching ACL data being found, the technology can store ACL data 225f to ACL database 230 and set ACL ID 220f of inode 210f to refer to ACL data 225f, as illustrated in FIG. 7. The technology can create a new directory entry, directory entry 315f, in de-duplication directory 310, as illustrated in FIG. 8. Directory entry 315f is associated with ACL data 225f. As illustrated, name 330f of directory entry 315f can be set to "555444~2" (e.g., "~2" indicating the second duplicate entry with a matching checksum).

Figure 9:
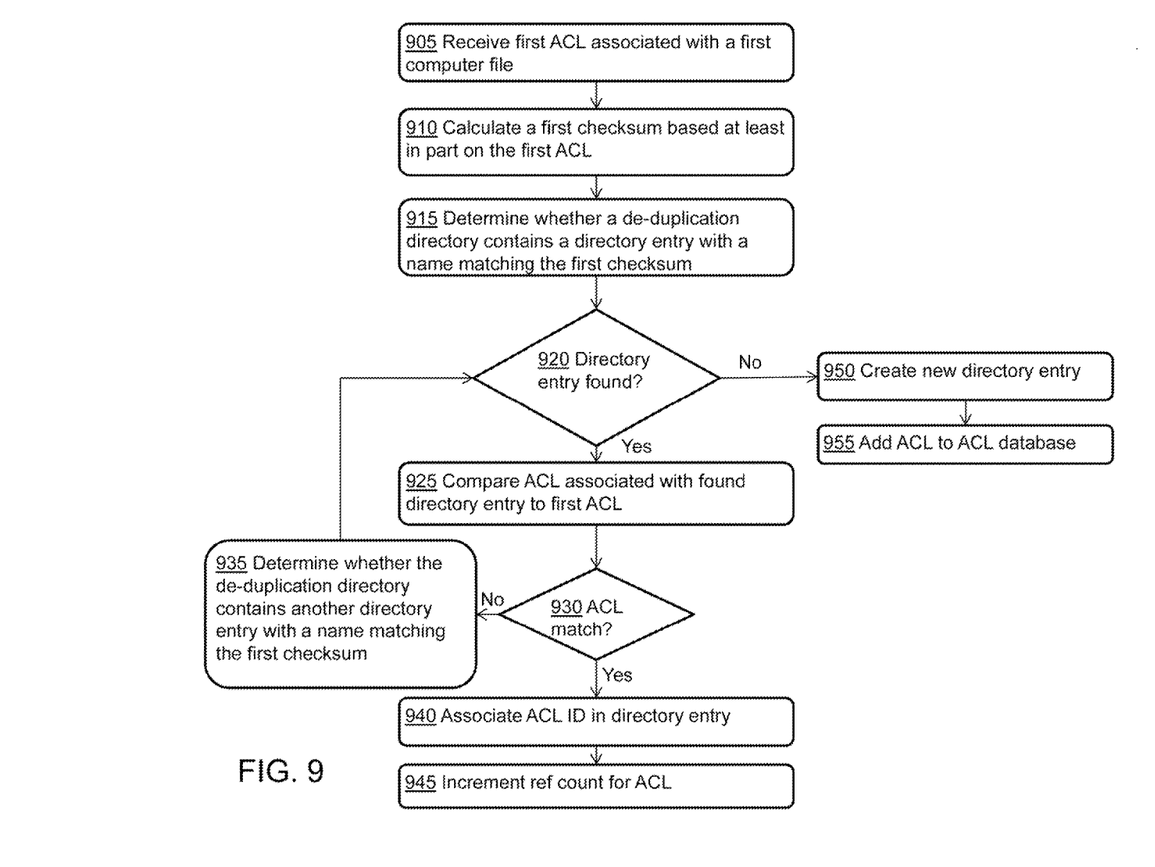
FIG. 9 illustrates a method of de-duplicating ACLs in accordance with embodiments the technology.

FIG. 9 illustrates a method of de-duplicating ACLs in accordance with the technology. At step 905, a storage system receives a first ACL associated with a first computer file. At step 910, the storage system calculates a first checksum based at least in part on the first ACL. At step 915, the storage system determines whether a de-duplication directory contains a directory entry with a name matching the first checksum. At step 920, if a matching directory is found, the method proceeds to step 925. If a matching directory is not found, the method proceeds to step 950. At step 925, the storage system compares the ACL associated with the found directory entry to the first ACL. At step 930, if the ACL associated with the found directory entry matches the first ACL (e.g., the ACLs specify the same permissions) the method proceeds to step 940. If the ACLs do not match, the method proceeds to step 935. At step 940, the first computer file is associated with the ACL ID from the found directory entry, and, at step 945, the reference count of the ACL is incremented.

Returning to step 935, the storage system determines whether the de-duplication directory contains another directory entry with a name matching the first checksum (e.g., the checksum with "~" followed by a number appended). Steps 920, 925, and 930, as described above, are repeated for the additional directory entries to determine if there is an ACL stored on the storage system that matches the first ACL. Returning to step 950, if no ACL stored on the storage system matches the first ACL, a new directory entry is created in the de-duplication directory. The new directory is associated with the first ACL. At step 955, the first ACL is added to the ACL database.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A storage system-implemented method for de-duplicating access control lists comprising:
   a. receiving, at the storage system from a client, a first computer file including a first access control list (ACL) identifier identifying first ACL data associated with the first computer file, the first ACL data specifying permissions for the first computer file, the storage system including an ACL database and a de-duplication directory, the de-duplication directory having a plurality of directory entries, each directory entry including a reference that references ACL data stored in the ACL database, and each directory entry having a name that corresponds to a checksum calculated based at least in part on the referenced ACL data;
   b. calculating, by the storage system, a first checksum based at least in part on the first ACL data identified by the first ACL identifier included in the first computer file;
   c. determining, by the storage system, whether or not the permissions specified by the first ACL data are previously stored in the ACL database based on (i) a respective directory entry of the de-duplication directory having a name that corresponds to the first checksum, (ii) the reference included in the respective directory entry referencing second ACL data stored in the ACL database that specify the same permissions specified by the first ACL data, and (iii) one or more references included in one or more of the plurality of directory entries, respectively, referencing the second ACL data stored in the ACL database that specify the same permissions specified by the first ACL data, and wherein the one or more of the plurality of directory entries comprise a first directory entry having a first name corresponding to the first checksum, and a second directory entry having a second name corresponding to the first checksum with duplicate indicia appended;
   d. de-duplicating the ACL database by the storage system, the de-duplicating of the ACL database including:
      having determined that the permissions specified by the first ACL data are not previously stored in the ACL database, storing the first ACL data in the ACL database; and
      having determined that the permissions specified by the first ACL data are previously stored in the ACL database, updating the first ACL identifier included in the first computer file to identify the second ACL data stored in the ACL database, and avoiding storing the first ACL data in the ACL database; and
   e. incrementing, by the storage system, a reference count associated with the second ACL data.

2. The method of claim 1, further comprising storing, by the storage system, the first computer file.

3. The method of claim 1, further comprising:
   retrieving the second ACL data from the ACL database stored on the storage system.

4. The method of claim 1, wherein the determining of whether or not the permissions specified by the first ACL data are previously stored in the ACL database is further based on the one or more of the plurality of directory entries of the de-duplication directory having one or more names, respectively, corresponding to the first checksum.

5. A storage system comprising:
   a storage processor providing a file system, the storage processor configured to:
      i. receive, from a client, a first computer file including a first access control list (ACL) identifier identifying first ACL data associated with the first computer file, the first ACL data specifying permissions for the first computer file, the storage system including an ACL database and a de-duplication directory, the de-duplication directory having a plurality of directory entries, each directory entry including a reference that references ACL data stored in the ACL database, and each directory entry having a name that corresponds to a checksum calculated based at least in part on the referenced ACL data;
      ii. calculate a first checksum based at least in part on the first ACL data identified by the first ACL identifier included in the first computer file;
      iii. determine whether or not the permissions specified by the first ACL data are previously stored in the ACL database based on (i) a respective directory entry of the de-duplication directory having a name that corresponds to the first checksum, (ii) the reference included in the respective directory entry referencing second ACL data stored in the ACL database that specify the same permissions specified by the first ACL data, and (iii) one or more references included in one or more of the plurality of directory entries, respectively, referencing the second ACL data stored in the ACL database that specify the same permissions specified by the first ACL data, and wherein the one or more of the plurality of directory entries comprise a first directory entry having a first name corresponding to the first checksum, and a second directory entry having a second name corresponding to the first checksum with duplicate indicia appended;
      iv. de-duplicate the ACL database including:
         having determined that the permissions specified by the first ACL data are not previously stored in the ACL database, store the first ACL data in the ACL database; and
         having determined that the permissions specified by the first ACL data are previously stored in the ACL database, update the first ACL identifier included in the first computer file to identify the second ACL data stored in the ACL database, and avoid storing the first ACL data in the ACL database; and
      v. increment a reference count associated with the second ACL data.

6. The storage system of claim 5, wherein the storage processor is further configured to store the first computer file.

7. The storage system of claim 5, wherein the storage processor is further configured to retrieve the second ACL data from the ACL database stored on the storage system.

8. The storage system of claim 5, wherein the storage processor is further configured to determine whether or not the permissions specified by the first ACL data are previously stored in the ACL database based on the one or more of the plurality of directory entries of the de-duplication directory having one or more names, respectively, corresponding to the first checksum.

9. A storage-system implemented method for reducing duplication of access control lists comprising:
   a. receiving, at the storage system from a client, a first computer file including a first access control list (ACL) identifier identifying first ACL data associated with the first computer file, the first ACL data specifying permissions for the first computer file, the storage system including an ACL database and a de-duplication directory, the de-duplication directory having a plurality of directory entries, each directory entry including a reference that references ACL data stored in the ACL database, and each directory entry having a name that corresponds to a checksum calculated based at least in part on the referenced ACL data;
   b. calculating, by the storage system, a first checksum based at least in part on the first ACL data identified by the first ACL identifier included in the first computer file;
   c. determining, by the storage system, whether or not the permissions specified by the first ACL data are previously stored in the ACL database based on (i) a respective directory entry of the de-duplication directory having a name that corresponds to the first checksum, (ii) the reference included in the respective directory entry referencing second ACL data stored in the ACL database that specify the same permissions specified by the first ACL data, and (iii) one or more references included in one or more of the plurality of directory entries, respectively, referencing the second ACL data stored in the ACL database that specify the same permissions specified by the first ACL data, and wherein the one or more of the plurality of directory entries comprise a first directory entry having a first name corresponding to the first checksum, and a second directory entry having a second name corresponding to the first checksum with first duplicate indicia appended;
   d. de-duplicating the ACL database by the storage system, the de-duplicating of the ACL database including:
      having determined that the permissions specified by the first ACL data are not previously stored in the ACL database, storing, by the storage system, to the de-duplication directory, a third directory entry comprising a first reference that references the first ACL data and a third name comprising the first checksum, and storing, by the storage system, the first ACL data in the ACL database; and
      having determined that the permissions specified by the first ACL data are previously stored in the ACL database, updating the first ACL identifier included in the first computer file to identify the second ACL data stored in the ACL database, and avoiding storing the first ACL data in the ACL database; and
   e. incrementing, by the storage system, a reference count associated with the second ACL data.

10. The method of claim 9, further comprising storing, by the storage system, the first computer file.

11. The method of claim 9, wherein the determining of whether or not the permissions specified by the first ACL data are previously stored in the ACL database is further based on the one or more of the plurality of directory entries of the de-duplication directory having one or more names, respectively, corresponding to the first checksum.

12. The method of claim 11, wherein the third name of the third directory entry corresponds to the first checksum with second duplicate indicia appended.

13. A storage system comprising:
   a storage processor providing a file system, the storage processor configured to:
      i. receive, from a client, a first computer file including a first access control list (ACL) identifier identifying first ACL data associated with the first computer file, the first ACL data specifying permissions for the first computer file, the storage system including an ACL database and a de-duplication directory, the de-duplication directory having a plurality of directory entries, each directory entry including a reference that references ACL data stored in the ACL database, and each directory entry having a name that corresponds to a checksum calculated based at least in part on the referenced ACL data;
      ii. calculate a first checksum based at least in part on the first ACL data identified by the first ACL identifier included in the first computer file;
      iii. determine whether or not the permissions specified by the first ACL data are previously stored in the ACL database based on (i) a respective directory entry of the de-duplication directory having a name that corresponds to the first checksum, (ii) the reference included in the respective directory entry referencing second ACL data stored in the ACL database that specify the same permissions specified by the first ACL data, and (iii) one or more references included in one or more of the plurality of directory entries, respectively, referencing the second ACL data stored in the ACL database that specify the same permissions specified by the first ACL data, and wherein the one or more of the plurality of directory entries comprise a first directory entry having a first name corresponding to the first checksum, and a second directory entry having a second name corresponding to the first checksum with first duplicate indicia appended;
      iv. de-duplicate the ACL database including:
         having determined that the permissions specified by the first ACL data are not previously stored in the ACL database, store, to the de-duplication directory, a third directory entry comprising a first reference that references the first ACL data and a third name comprising the first checksum, and store the first ACL data in the ACL database; and
         having determined that the permissions specified by the first ACL data are previously stored in the ACL database, update the first ACL identifier included in the first computer file to identify the second ACL data stored in the ACL database, and avoid storing the first ACL data in the ACL database; and
      v. increment a reference count associated with the second ACL data.

14. The storage system of claim 13, wherein the storage processor is further configured to store the first computer file.

15. The storage system of claim 13, wherein the storage processor is further configured to determine whether or not the permissions specified by the first ACL data are previously stored in the ACL database based on the one or more of the plurality of directory entries of the de-duplication directory having one or more names, respectively, corresponding to the first checksum.

16. The storage system of claim 15, wherein the third name of the third directory entry corresponds to the first checksum with second duplicate indicia appended.

* * * * *